(12) United States Patent
Dhawan et al.

(10) Patent No.: US 11,171,839 B2
(45) Date of Patent: *Nov. 9, 2021

(54) DYNAMIC ENGINE FOR MATCHING COMPUTING DEVICES BASED ON USER PROFILES AND MACHINE LEARNING

(71) Applicant: Bank of America Corporation, Charlotte, NC (US)

(72) Inventors: Lalit Dhawan, Franklin Park, NJ (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,991

(22) Filed: Mar. 15, 2021

(65) Prior Publication Data

US 2021/0203566 A1 Jul. 1, 2021

Related U.S. Application Data

(63) Continuation of application No. 16/202,307, filed on Nov. 28, 2018, now Pat. No. 10,985,995.

(51) Int. Cl.
*H04L 12/24* (2006.01)
*G06F 16/14* (2019.01)
(Continued)

(52) U.S. Cl.
CPC ............ *H04L 41/16* (2013.01); *G06F 16/148* (2019.01); *G06N 20/00* (2019.01); *H04L 67/06* (2013.01); *H04L 67/26* (2013.01); *H04L 67/306* (2013.01)

(58) Field of Classification Search
CPC ....... H04L 41/16; H04L 67/06; H04L 67/306; H04L 67/26; H04L 67/30; G06F 16/148; G06N 20/00; G06Q 30/08
See application file for complete search history.

(56) References Cited

U.S. PATENT DOCUMENTS

5,940,812 A  8/1999 Tengel et al.
6,988,082 B1  1/2006 Williams et al.
(Continued)

*Primary Examiner* — Javier O Guzman
(74) *Attorney, Agent, or Firm* — Banner & Witcoff, Ltd.; Michael A. Springs (57) ABSTRACT

Aspects of the disclosure relate to transferring data using a dynamic data management system. A computing platform having at least one processor, a memory, and a communication interface may receive, by the at least one processor, via the communication interface, and from a dynamic data management node, at least one organization computing system data file profile and a plurality of client computing device data file profiles. The computing platform may identify, based on the at least one organization computing system data file profile, the plurality of client computing device data file profiles, and a machine learning dataset, a potential match between the at least one organization computing system data file profile and at least one client computing device data file profile. The computing platform may establish a connection with the at least one client computing device and, while the connection is established, transmit a notification which, when processed by the one or more client computing devices, causes the notification to be displayed on the at least one client computing device.

18 Claims, 7 Drawing Sheets

(51) Int. Cl.
*H04L 29/08* (2006.01)
*G06N 20/00* (2019.01)

(56) References Cited

U.S. PATENT DOCUMENTS

| | | | |
|---|---|---|---|
| 7,315,841 | B1 | 1/2008 | McDonald et al. |
| 7,366,694 | B2 | 4/2008 | Lazerson |
| 7,386,504 | B2 | 6/2008 | McDonald et al. |
| 7,447,656 | B2 | 11/2008 | Parthasarathy |
| 7,447,659 | B2 | 11/2008 | Parthasarathy |
| 7,593,893 | B1 | 9/2009 | Ladd et al. |
| 7,873,569 | B1 | 1/2011 | Cahn |
| 8,095,458 | B2 | 1/2012 | Peterson et al. |
| 8,666,879 | B1 | 3/2014 | Palumbo et al. |
| 8,671,052 | B1 | 3/2014 | Palumbo et al. |
| 10,621,535 | B1* | 4/2020 | Lawrence ........ G06Q 10/06393 |
| 2004/0049450 | A1 | 3/2004 | Lussler |
| 2007/0073613 | A1 | 3/2007 | Lee |
| 2007/0105536 | A1 | 5/2007 | Tingo |
| 2008/0071746 | A1 | 3/2008 | Concordia et al. |
| 2008/0270320 | A1 | 10/2008 | Chien |
| 2010/0131390 | A1 | 5/2010 | Emswiler |
| 2010/0131418 | A1 | 5/2010 | McCagg et al. |
| 2012/0330708 | A1 | 12/2012 | Khan |
| 2012/0330856 | A1 | 12/2012 | Hyder et al. |
| 2015/0170270 | A1 | 6/2015 | Hsu |
| 2015/0220885 | A1* | 8/2015 | Cohen ................ G06Q 10/1053 705/321 |
| 2015/0227892 | A1* | 8/2015 | Goel ................ G06Q 10/1053 705/321 |
| 2015/0248647 | A1* | 9/2015 | Goel ................ G06Q 10/1053 705/321 |
| 2016/0019642 | A1 | 1/2016 | Dash et al. |
| 2016/0371772 | A1 | 12/2016 | Zuluaga Rueda et al. |
| 2018/0024018 | A1 | 1/2018 | Lee |
| 2019/0197487 | A1 | 6/2019 | Jersin et al. |
| 2019/0318315 | A1 | 10/2019 | Clark-Lindh et al. |

* cited by examiner

Potential Lender Identified

Our proprietary matching system has identified [Lender L] offering loan terms that may be of interest to you. Please select one of the options below to pursue this opportunity.

| Send message to [Lender L] | View Public Profile of [Lender L] | Not Interested |

FIG. 3

Loan Opportunity Identified

Lender L is offering a loan of $ X,XXX,XXX at [Terms T]. The amount in excess of your required amount may be loaned to YY available borrowers at [Terms T+] resulting in a net gain. Please select one of the options below to pursue this opportunity.

| Send message to [Lender L] | View Public Profiles of Prospective Borrowers | Not Interested |

DYNAMIC ENGINE FOR MATCHING COMPUTING DEVICES BASED ON USER PROFILES AND MACHINE LEARNING

CROSS REFERENCE TO RELATED APPLICATIONS

This application is a continuation of U.S. application Ser. No. 16/202,307 filed Nov. 28, 2020, which is incorporated herein by reference in its entirety.

BACKGROUND

Aspects of the disclosure relate to electrical computers, digital processing systems, and multicomputer data transferring. In particular, one or more aspects of the disclosure relate to a computing system for intelligently matching computing devices, such as organization- and client computing devices, based on dynamically generated user profiles and machine learning.

SUMMARY

Aspects of the disclosure provide effective, efficient, scalable, and convenient technical solutions that address and overcome the technical problems associated with dynamic data management and more particularly to leveraging machine learning and dynamic user profiles to selectively transmit relevant information to both organization and client computing devices.

In accordance with one or more embodiments, a computing platform having at least one processor, a memory, and a communication interface may receive, by the at least one processor, via the communication interface, and from a dynamic data management node, at least one organization computing system data file profile and a plurality of client computing device data file profiles. The computing platform may identify, based on the at least one organization computing system data file profile, the plurality of client computing device data file profiles, and a machine learning dataset, a potential match between the at least one organization computing system data file profile and at least one client computing device data file profile. The computing platform may establish a connection with the at least one client computing device and, while the connection is established, transmit a notification which, when processed by the one or more client computing devices, causes the notification to be displayed on the at least one client computing device.

In some aspects, the memory may store additional computer-readable instructions that, when executed by the at least one processor, further cause the computing platform to establish a connection with the at least one organization computing device and, while the connection is established, transmit a notification which, when processed by the one or more organization computing devices, causes the notification to be displayed on the at least one organization computing device.

In some aspects, the memory may store additional computer-readable instructions that, when executed by the at least one processor, further cause the computing platform to identify, based on the at least one organization computing system data file profile, the plurality of client computing device data file profiles, and a machine learning dataset, a potential match between the at least one organization computing system data file profile and a first client computing device data file profile when a second client computing device data profile serves as an intermediary between the at least one organization computing system data file profile and the first client computing device data file profile; and establish a connection with the second client computing device and, while the connection is established, issue a command to transmit a notification which, when processed by the second client computing device, causes a notification to be displayed on the second client computing device.

In other aspects, the memory may store additional computer-readable instructions that, when executed by the at least one processor, further cause the computing platform to receive, by the at least one processor, via the communication interface, and from a dynamic data management node, at least one organization computing system private profile; receive, by the at least one processor, via the communication interface, and from a dynamic data management gateway, authorization from the at least one organization computing system to transmit the at least one organization computing system private profile to a first client computing device; and establish a connection with the first client computing device and, while the connection is established, transmit a data file which, when processed by the first client computing device, causes the at least one organization computing system private profile to be displayed on the first client computing device. The organization computing system private profile may be generated, for example, after receiving a request from the first client computing device.

In yet other aspects, the memory may store additional computer-readable instructions that, when executed by the at least one processor, further cause the computing platform to receive, by the at least one processor, via the communication interface, and from a dynamic data management node, a first client computing system private profile; receive, by the at least one processor, via the communication interface, and from a dynamic data management gateway, authorization from the first client computing system to transmit the first client computing system private profile to the at least one organization computing device; and establish a connection with the at least one organization computing device and, while the connection is established, transmit a data file which, when processed by the at least one organization computing device, causes the first client computing system private profile to be displayed on the at least one organization computing device. The first client computing system private profile may be generated, for example, after receiving a request from the at least one organization computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Even when an enterprise organization offers a variety of products and services to clients, some clients may have a need for specifications which vary from those offered by the enterprise organization. Administrative considerations may make it infeasible or impractical for the enterprise organization to offer products or services tailored to individual client needs. In some situations, however, there may be opportunities for one client to facilitate a transaction for other client(s) that the enterprise organization may not have offered to the other client(s) directly. For example, a financial institution may require a minimum loan amount. When a first client wishes to obtain a loan for less than the minimum required amount, a second client may secure a loan from the financial institution (in at least the minimum required amount) for purposes of loaning a lesser amount to the first client and possibly one or more other similarly situated clients. The second client may effectively act as a wholesaler and, in this example, may benefit by charging the first client a higher interest rate for the redistributed loan portion. Aspects disclosed herein may provide technological solutions to identify potential transaction partners as well as related considerations such as selectively sharing more detailed (e.g., "private") user profiles upon the authorization of the respective parties.

Figure 1A:
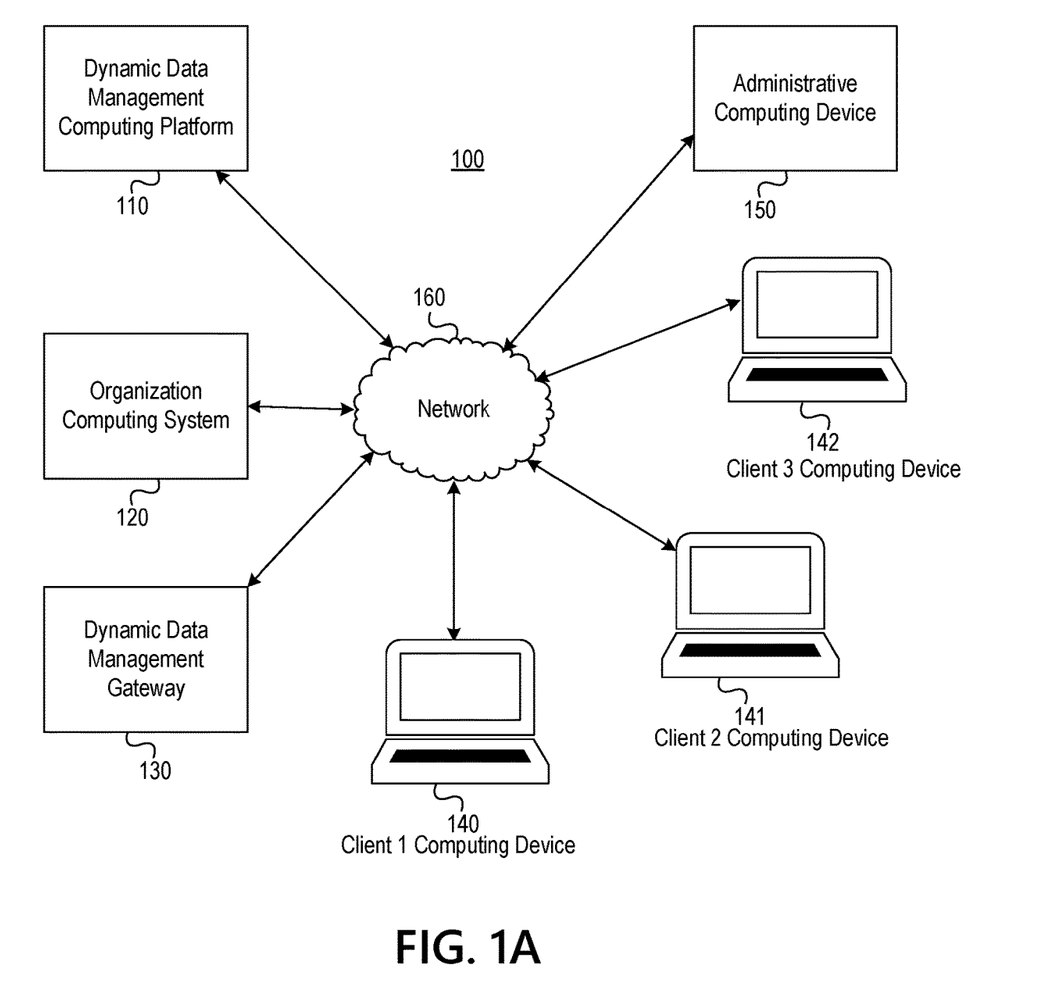
FIGS. 1A and 1B depict an illustrative computing environment for matching computing devices using a dynamic data management system in accordance with one or more example embodiments.
Figure 1B:
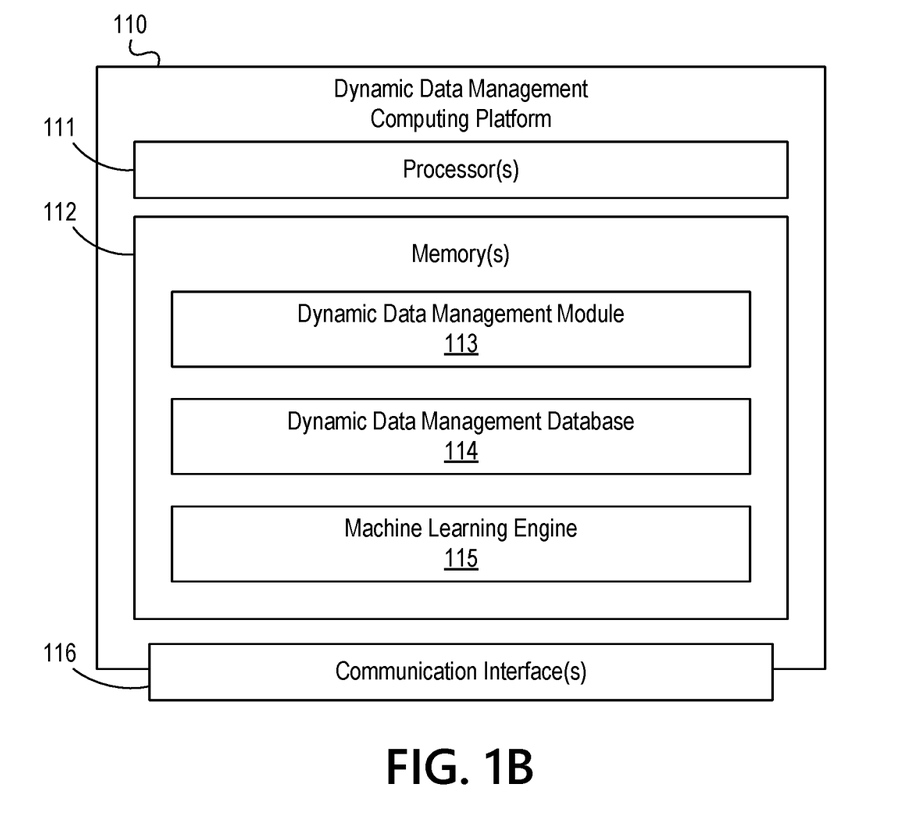

FIGS. 1A and 1B depict an illustrative computing environment 100 for selectively establishing connections between computing devices using a dynamic data management system in accordance with one or more example embodiments. Referring to FIG. 1A, the computing environment 100 may include one or more computing devices and/or other computer systems. For example, the computing environment 100 may include a dynamic data management platform 110, one or more organization computing systems 120, a dynamic data management gateway 130, one or more client computing devices 140, 141, and 142, and an administrative computing device 150.

The dynamic data management platform 110 may be configured to monitor, control, and/or affect data transfers between systems by controlling and/or directing actions of other devices and/or computer systems, and/or may be configured to perform other functions, as discussed in greater detail below. In some instances, dynamic data management platform 110 may perform and/or provide one or more techniques to monitor, control, and/or affect data transfers between multiple computing systems.

The organization computing system 120 may be configured to receive and/or transmit data files on behalf of a first enterprise organization. For example, the organization computing system 120 may be configured to perform one or more functions and/or tasks on behalf of the enterprise organization. The client computing devices 140, 141, and 142 be configured to receive and/or transmit data files on behalf of respective clients. For example, the client computing devices 140, 141, and 142 may be configured to perform one or more functions and/or tasks on behalf of the respective clients.

A dynamic data management gateway 130 may be configured to receive, intercept, and/or transmit data files that are transferred or sought to be transferred between multiple different systems. For example, the dynamic data management gateway 130 may be configured to receive, intercept and/or analyze data file transfers from one or more systems of the enterprise organization (e.g., organization computing system 120 and/or client computing devices 140, 141, and 142).

After receiving and/or intercepting the data files, the dynamic data management gateway 130 may transmit the data files to the dynamic data management computing platform 110. Additionally, and/or alternatively, the dynamic data management gateway 130 may be connected to one or more systems of an enterprise organization. For example, the dynamic data management gateway 130 may be a node that is connected to a system, such as the organization computing system 120. After the organization computing system 120 transfers a data file, the dynamic data management gateway 130 may intercept the data file. Then, the dynamic data management gateway 130 may transfer the data file to the dynamic data management computing platform 110. In some examples, after the dynamic data management computing platform 110 analyzes the data file, the dynamic data management gateway 130 may receive requests for information, transmit requested information, receive commands, execute the commands, and/or perform other functions, as discussed in greater detail below. In some instances, the dynamic data management gateway 130 might not be another entity, and the functionalities of the dynamic data management gateway 130 may be included within the dynamic data management computing platform 110.

An administrative computing device 150 may be configured to be used by one or more administrators of computing environment 100. For example, the administrative computing device 150 may be configured to display, present, and/or otherwise provide one or more user interfaces that enable the one or more administrators to monitor one or more tasks performed by a system of the enterprise organization. The administrative computing device 150 may receive, from the one or more administrators, user input or selections and send the user input or selections to the dynamic data management computing platform 110 and/or one or more other computer systems and/or devices in computing environment 100. The administrative computing device 150 may receive, from the dynamic data management computing platform 110 and/or one or more other computer systems and/or devices in computing environment 100, information or data in response to the user input or selection. In some examples, the administrative computing device 150 may provide the rules for determining whether requested data file transfers are authorized. Such rules may be preset by a participating organization computing system 120, and/or modified dynamically by instructions received from the organization computing system 120, and/or from other sources such as machine learning engine 115.

The data management computing platform 110 is dynamic insofar as it may respond, in real time, to changing business rules, contracts, regulations, confidentiality designations, and/or other criteria defining a profile for the organization computing system 120 and/or profiles for the client computing devices 140, 141, and 142. In some examples, a machine learning engine 115 may assist the data management module 113 by processing such data as historical activities, business rules, and/or other criteria provided by the participating enterprise organizations computing system 120 and/or administrative computing device 150. In some examples, the machine learning engine 115 may create models and/or assign values or rankings to a plurality of data sources to further develop the artificial intelligence used for managing data transmissions as described herein.

In one or more arrangements, the organization computing system 120, dynamic data management gateway 130, client computing device 140, and administrative computing device 150 may be any type of computing device capable of providing a user interface, receiving input via the user interface, and communicating the received input to one or more other computing devices. For example, the organization computing system 120, dynamic data management gateway 130, client computing device 140, and administrative computing device 150 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of organization computing system 120, dynamic data management gateway 130, client computing devices 140, 141, and 142, and administrative computing device 150 may, in some instances, be special-purpose computing devices configured to perform specific functions.

Computing environment 100 also may include one or more computing platforms. For example, and as noted above, computing environment 100 may include dynamic data management computing platform 110. As illustrated in greater detail below, the dynamic data management computing platform 110 may include one or more computing devices configured to perform one or more of the functions described herein. For example, the dynamic data management computing platform 110 may include one or more computers (e.g., laptop computers, desktop computers, servers, server blades, or the like).

Computing environment 100 also may include one or more networks, which may interconnect one or more of the organization computing system 120, dynamic data management gateway 130, client computing device 140, and administrative computing device 150. For example, computing environment 100 may include network 160. Network 160 may include one or more sub-networks (e.g., local area networks (LANs), wide area networks (WANs), or the like). For example, network 160 may include a private sub-network that may be associated with a particular organization (e.g., a corporation, financial institution, educational institution, governmental institution, or the like) and that may interconnect one or more computing devices associated with the organization. For example, dynamic data management computing platform 110, organization computing system 120, dynamic data management gateway 130, client computing devices 140-142, and administrative computing device 150 may be associated with an organization, and a private sub-network included in network 160 and associated with and/or operated by the organization may include one or more networks (e.g., LANs, WANs, virtual private networks (VPNs), or the like) that interconnect dynamic data management computing platform 110, organization computing system 120, dynamic data management gateway 130, client computing devices 140-142, and administrative computing device 150. Network 160 also may include a public sub-network that may connect the private sub-network and/or one or more computing devices connected thereto (e.g., dynamic data management computing platform 110, organization computing system 120, dynamic data management gateway 130, client computing device 140, and administrative computing device 150) with one or more networks and/or computing devices that are not associated with the organization.

Referring to FIG. 1B, dynamic data management computing platform 110 may include one or more processors 111, memory 112, and communication interface 116. A data bus may interconnect processor(s) 111, memory 112, and communication interface 116. Communication interface 116 may be a network interface configured to support communication between dynamic data management computing platform 110 and one or more networks (e.g., network 160). Memory 112 may include one or more program modules having instructions that when executed by processor(s) 111 cause the dynamic data management computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of the dynamic data management computing platform 110 and/or by different computing devices that may form and/or otherwise make up the dynamic data management computing platform 110. For example, memory 112 may have, store, and/or include a dynamic data management module 113, a dynamic data management database 114, and a machine learning engine 115. Dynamic data management module 113 may have instructions that direct and/or cause dynamic data management computing platform 110 to analyze data transfers between systems, as discussed in greater detail below. Dynamic data management database 114 may store information used by the dynamic data management module 113 and/or the dynamic data management computing platform 110 in analyzing data transfers between systems and/or in performing other functions. Machine learning engine 115 may have instructions that direct and/or cause the dynamic data management computing platform 110 to set, define, and/or iteratively redefine optimization rules, techniques and/or other parameters used by dynamic data management computing platform 110 and/or other systems in computing environment 100.

In some examples, the dynamic data management computing platform 110 may create weighted grids of profiles, e.g., in the context of loan products this may include a weighted grid of borrowers and a weighted grid of lenders based on criteria as previously described, similar to a standard industrial classification (SIC) code. The product specifications requested or offered by the borrowers and lenders may be available to clients on the network, e.g., without identifying specific parties. In some aspects, users may browse the available product specifications to identify potential products or services of interest, either from the enterprise organization(s) directly or as may be brokered by another user as described herein. In other aspects, the dynamic data management computing platform 110 may identify potential matches and transmit notifications to the respective users to initiate further action as described herein.

The dynamic data management computing platform 110 also may function to identify opportunities such as "stacking" financial products to maximize benefits. For example, in some cases it may be more beneficial for a client to obtain two loans of lesser amounts than a single loan of a larger amount.

In some aspects, the data file profiles may identify not only the preferences of an enterprise user or client, but also the reason for such preferences as determined, for example, through machine learning engine 115. The reason for client behaviors may be determined, for example, by analyzing events as they may relate to one another. As an example, a client may purchase a house and then purchase furniture. By observing such trends, machine learning engine 115 may determine that the furniture purchase was attributable to the house purchase, e.g., and the client should not be expected to buy more furniture soon.

Figure 1C:
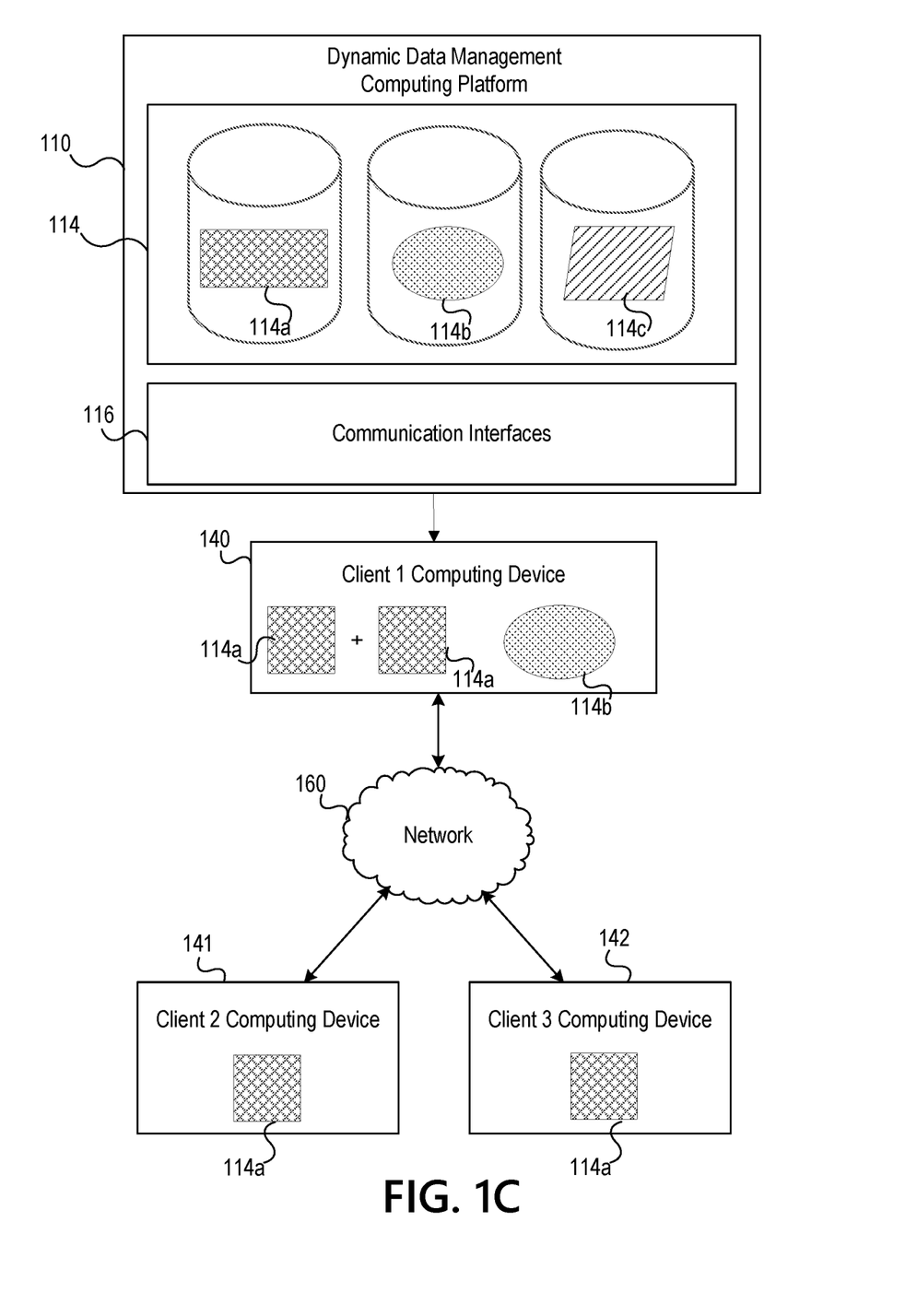
FIG. 1C depicts an illustrative dynamic data management database for facilitating multiple-client transactions in accordance with one or more example embodiments.

FIG. 1C schematically illustrates an example of a dynamic data management database 114 which, for example, may be maintained and/or controlled by an enterprise organization. The enterprise organization may offer different products and/or services, the data file profiles for which are representatively shown as data silos 114a, 114b, and 114c. As shown schematically in FIG. 1C, the first data silo 114a may contain the terms of a first financial product such as a loan, the second data silo 114b may contain the terms of a second financial product, and the third data silo 114c may contain the terms of a third financial product.

The dynamic data management computing platform 110 may compare the data file profiles 114a, 114b, and 114c to client data file profiles within the computing system environment and identify any possible matches. In the example illustrated in FIG. 1C, a first client computing device 140 may have an associated data file profile that matches the data file profile 114b of the enterprise organization. The dynamic data management computing platform 100 may establish a connection with the first client computing device (e.g., via network 160 as previously described) and transmit the data file profile 114b to the first client computing device 140. The dynamic data management computing platform 110 may also determine that, although data file profile 114a is not directly a match for the first client computing device 140, the data file profile for the first client computing device 140 suggest that the first client computing device 140 potentially could serve as an intermediary to facilitate transactions with other system client computing devices 141 and 142. For example, in the case of a loan transaction, a user of the first client computing device 140 may have a higher credit score than that of the users of the second 141 and third 142 client computing devices, enabling the user of the first client computing device 140 to obtain a loan offered by the enterprise organization (represented by data file profile 114a) for which neither the second 141 nor the third 142 client computing devices would have qualified. The dynamic data management computing platform 100 may determine that the first client computing device 140 could serve as an intermediary to make separate loans to the users of the second 141 and third 142 client computing devices. Upon making such a determination, the dynamic data management computing platform 100 may transmit an appropriate notification to the first client computing device 140 to advise the client of the potential opportunity.

Figure 2A:
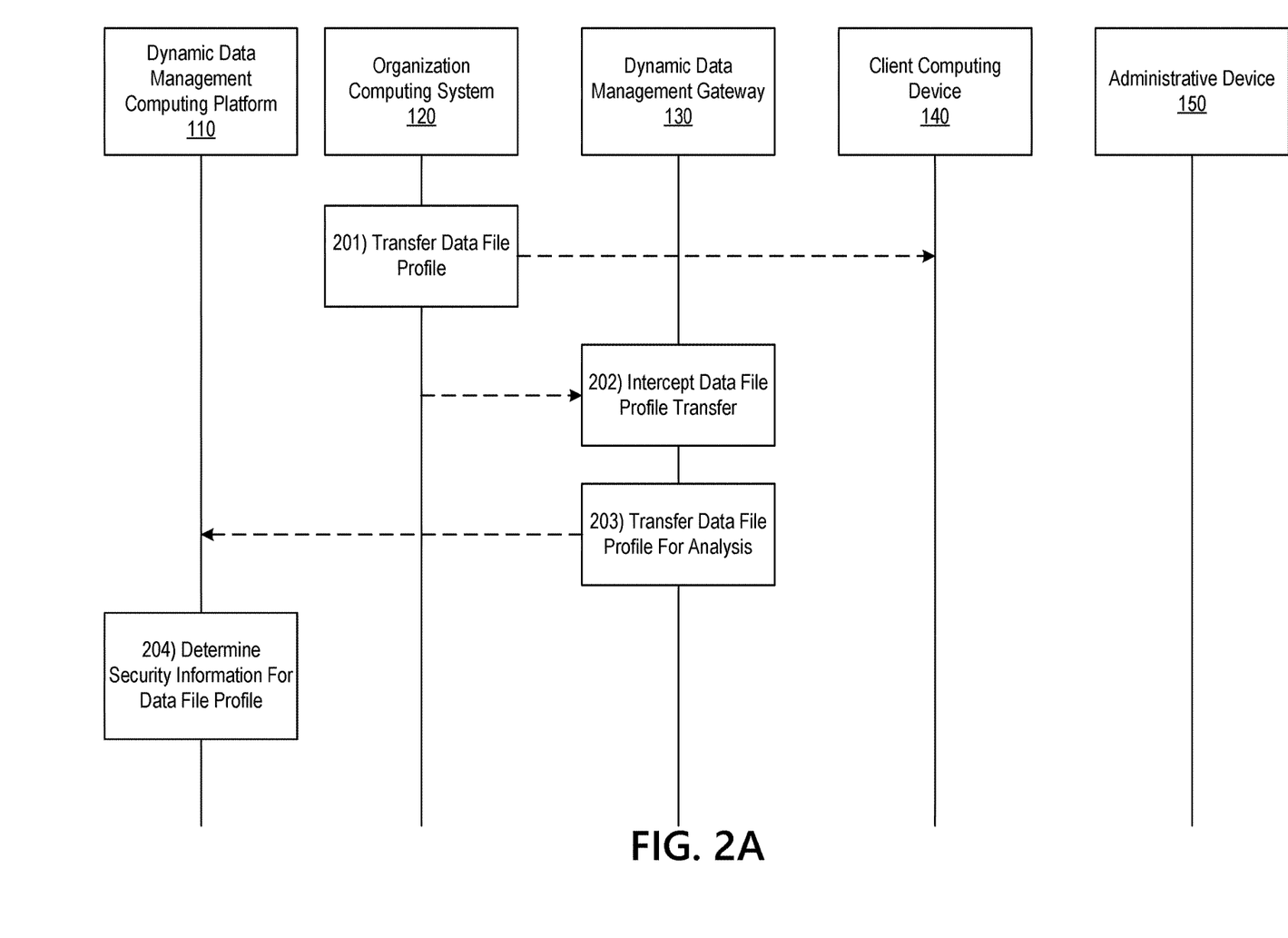
FIGS. 2A and 2B depict an illustrative event sequence for transferring data files and profiles using a dynamic data management system in accordance with one or more example embodiments.
Figure 2B:
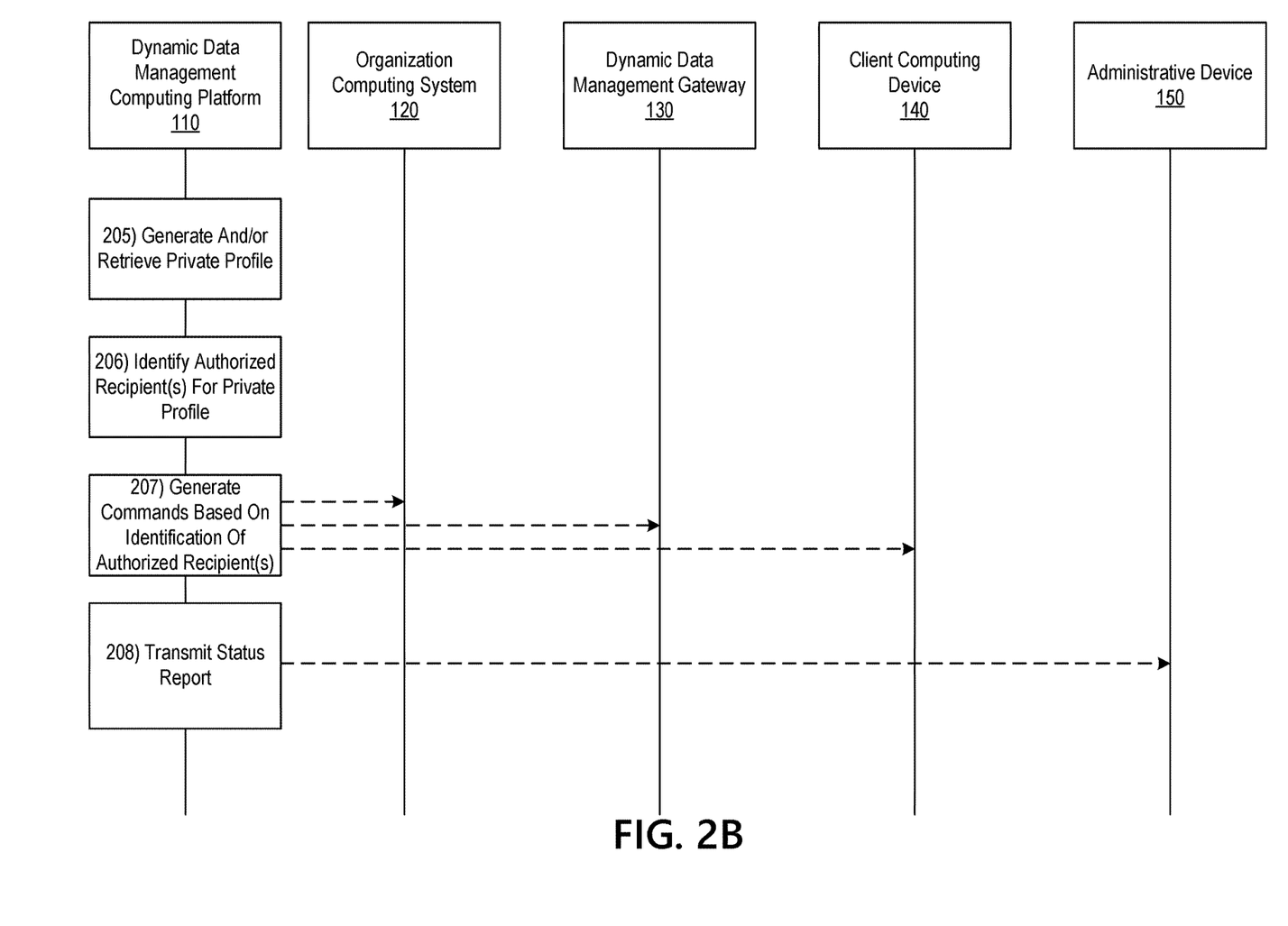

FIGS. 2A and 2B depict an illustrative event sequence for transferring data file profiles using a dynamic data management system in accordance with one or more example embodiments. Referring to FIG. 2A, at step 201, the first organization computing system 120 may transmit one or more data files profiles to another system, such as a client computing device 140. At step 201, the first organization computing system 120 may perform a step of the task of transmitting the data file profile to the first client computing device 140. At step 202, dynamic data management gateway 130 may intercept the data file transfer. For example, the dynamic data management gateway 130 may be connected, attached, and/or otherwise in communication with the first organization computing system 120. When the first organization computing system 120 transmits one or more data file profiles, the dynamic data management gateway 130 may intercept the data file profile transfer. Thus, prior to the client computing device 140 receiving the data file profile, the dynamic data management gateway 130 may intercept the data file profile. In some embodiments, the first organization computing system 120 may transmit the data file directly to the dynamic data management gateway 130.

In some examples, a plurality of dynamic data management gateways 130 may be connected to a plurality of different systems within the enterprise organization. Each dynamic data management gateway 130 may intercept and/or receive data file transfers for one or more systems within the enterprise organization. Further, in some instances, the dynamic data management gateway 130 may be a portable computing device and/or a node that may be connected to a system of the enterprise organization (e.g., first organization computing system 120). In such instances, the dynamic data management gateway 130 may be plugged in or attached to the system. After plugging in or attaching to the system, the dynamic data management gateway 130 may intercept communications (e.g., data file transfers) between the attached system and one or more other systems in the enterprise organization.

At step 203, dynamic data management gateway 130 may transfer the data file profile for security analysis. For example, the dynamic data management gateway 130 may transfer the data file profile to the dynamic data management computing platform 110. At step 204, after the dynamic data management computing platform 110 receives the transferred data file profile, the dynamic data management computing platform 110 may determine security information associated with the data file profile. The security information may correspond to characteristics and/or properties of the data file profile, such as an identification of other enterprise organization(s) or client(s) with whom the data file is authorized to be shared, and/or other attributes associated with the data file profile from which a security determination may be made.

In some examples, the dynamic data management computing platform 110 may determine security information corresponding to a particular data file profile, such as whether the data file profile has been designated as "public" or "private" by the originating entity. Additionally, and/or alternatively, the dynamic data management computing platform 110 may determine security information corresponding to the system transferring the data file profile (e.g., the first organization computing system 120), the system receiving the data file (e.g., the first client computing device 140), and/or the task being performed by the systems (e.g., the task being performed by the first organization computing system 120 and the first client computing device 140).

Referring to FIG. 2B, at step 205, dynamic data management computing platform 110 may generate and/or retrieve, from the dynamic data management database 114, a data file profile associated with the security information determined at step 204. For example, based on similar characteristics, properties, systems (e.g., first organization computing system 120 and/or first client computing device 140), identifiers, and/or other identification information described at step 204, the dynamic data management computing platform 110 may retrieve an appropriate data file profile. The dynamic data management computing platform 110 may determine characteristics, properties, attributes, and/or other criteria associated with a potential transaction. In some examples, respective public profiles which contains basic information about the enterprise organization(s) and clients and desired terms for a particular transaction may be viewed by other entities interested in transactions with similar or complementary terms without prior authorization. After entities establish contact with each other and there is mutual interest in pursuing a transaction, dynamic data management computing platform 110 may authorize the transfer of the entities' respective private profiles which contain more detailed information about the parties and the desired transaction.

Figure 3:
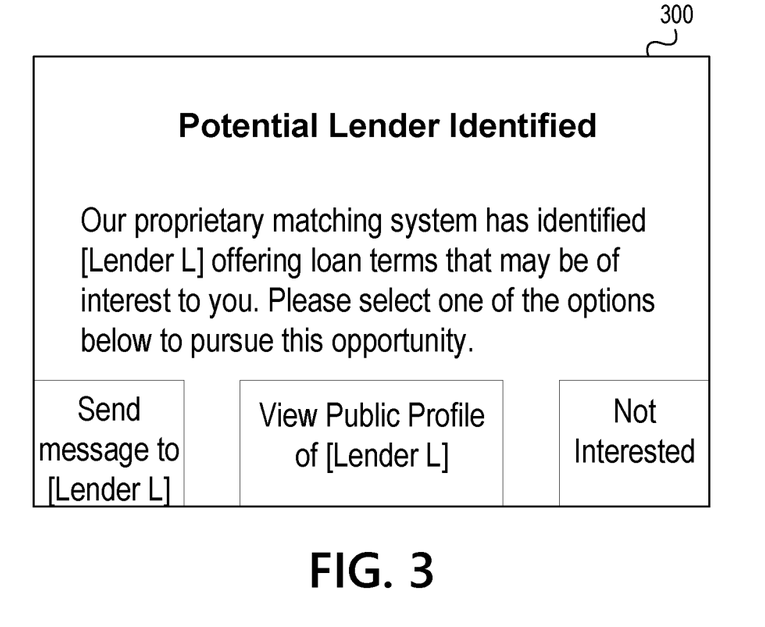
FIGS. 3 and 4 depict example graphical user interfaces for client computing devices in accordance with one or more example embodiments.
Figure 4:
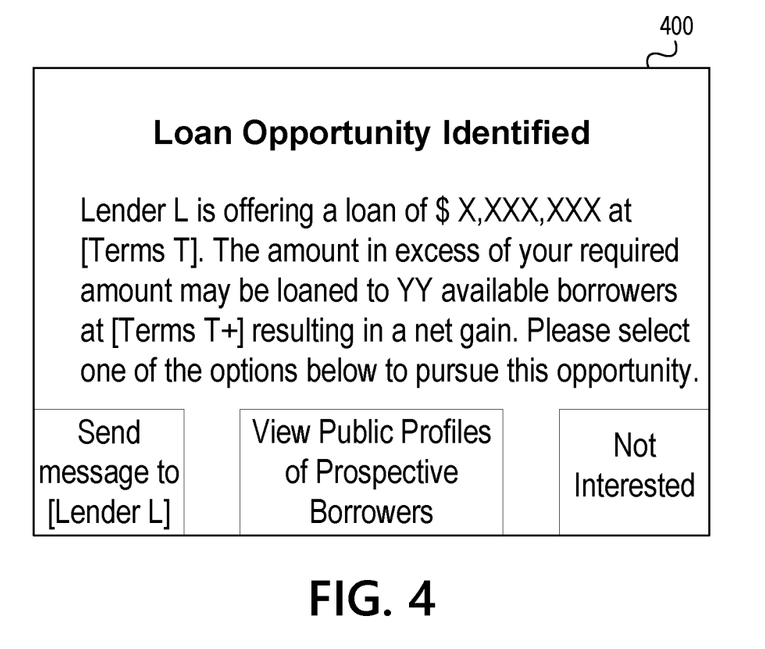

FIGS. 3 and 4 show examples of user interfaces 300 and 400, respectively. FIG. 3 shows an example of a user interface 300 that may inform a client of a potential lender (e.g., an enterprise organization or another client redistributing funds as described herein). The interface 300 may include options for the client to transmit a message to the prospective lender, view more information about the lender as included, for example, in its public profile, or indicate a lack of interest in the proposed transaction. Depending on the option selected by the user, the dynamic data management computing platform 110 may initiate subsequent steps as appropriate.

FIG. 4 shows an example of a user interface 400 for notifying a client of a possible opportunity for transactions with other clients. As shown, the notification indicates that a loan of a larger amount than needed is available to the user, and that other clients are interested in borrowing smaller amounts such that the user may divide and redistribute the loan proceeds at a higher interest rate to the other borrowers. The interface 400 may include options for the user to transmit a message to the financial institution, view more information about the prospective borrowers as included, for example, in their respective public profiles, or indicate a lack of interest in the proposed transaction. Depending on the option selected by the user, the dynamic data management computing platform 110 may initiate subsequent steps as appropriate.

Figure 5:
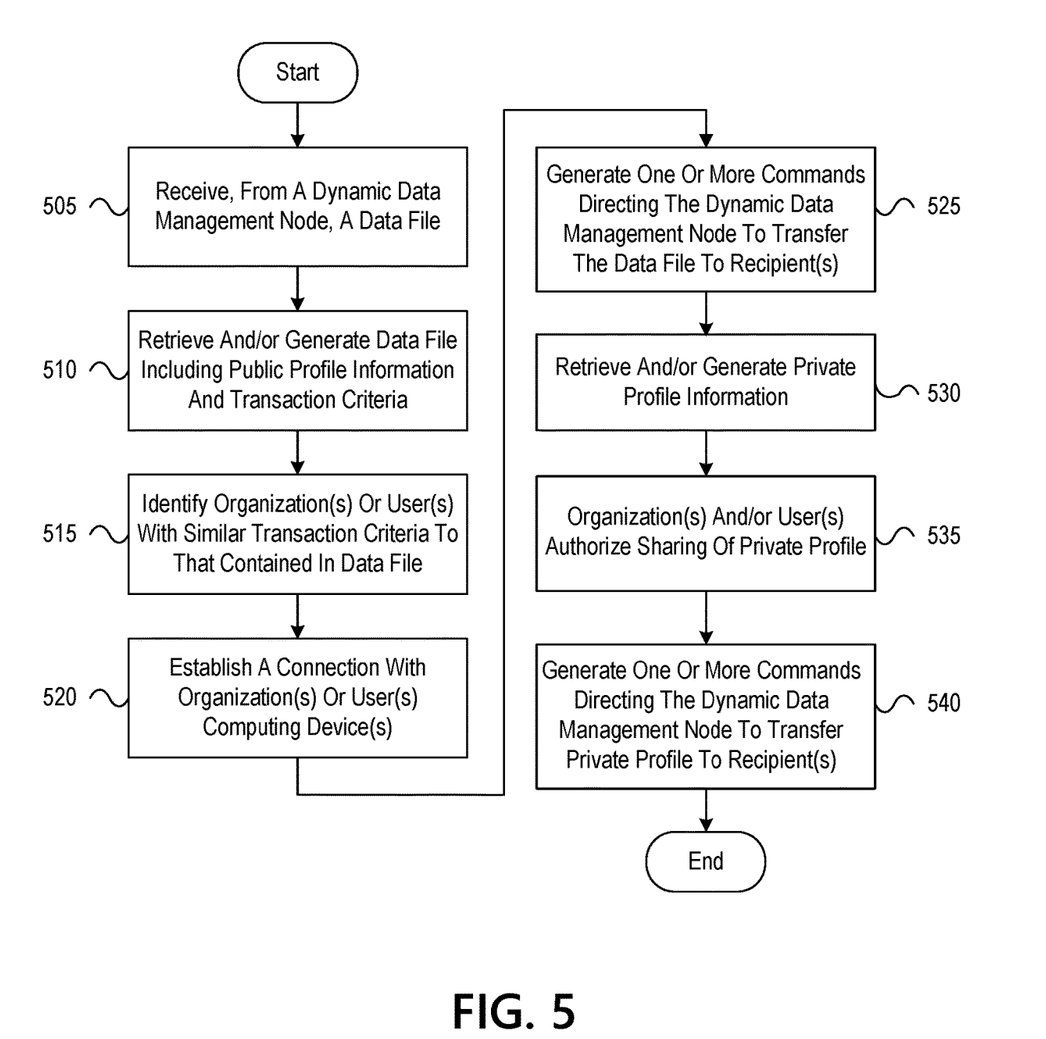
FIG. 5 depicts an illustrative method for transferring data using a dynamic data management system in accordance with one or more example embodiments.

FIG. 5 depicts an illustrative method for transferring data using a dynamic data management system in accordance with one or more example embodiments. Referring to FIG. 5, at step 505, a computing platform having at least one processor, a memory, and a communication interface may receive, by the at least one processor, via the communication interface, and from a dynamic data management node, a data file. At step 510, the computing platform may retrieve a public profile including at least transaction criteria. In some examples, the data file profile may be generated on-demand, e.g., upon receipt of a request for the data file profile. At step 515, the computing platform may identify, based on the data file profile, one or more organizations or users who have criteria similar or complementary to the data file profile. At step 520, the computing platform may establish a connection with computing device(s) associated with the authorized organization(s) or user(s). At step 525, the computing platform may generate one or more commands directing the dynamic data management node to transfer the data file profile to the appropriate recipient(s). At step 530, the computing platform may retrieve and/or generate a private profile. At step 535, the computing platform may receive authorization from the organization(s) and/or user(s) to share the private profile(s). At steps 540, the computing platform may generate command(s) for the dynamic data management node to transmit the private profile(s) to the appropriate recipient(s).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a dynamic data management gateway communicatively coupled to a network;
a computing platform comprising:
at least one processor;
a communication interface communicatively coupled to the network and at least one processor; and
memory storing computer-readable instructions that, when executed by the at least one processor, cause the computing platform to:
receive, via the communication interface from the dynamic data management gateway, at least one organization computing system data file profile and a plurality of client computing device data file profiles;
identify, by a machine learning engine and based on processing the at least one organization computing system data file profile, the plurality of client computing device data file profiles, and a machine learning dataset, information with respect to historical activities, business rules, and values or rankings assigned to a plurality of data sources, a potential match between the at least one organization computing system data file profile and a first client computing device data file profile when, and only when, the first client computing device data file profile fails to qualify as a potential match directly with the at least one organization computing system data file profile and so that a second client computing device data profile serves as an intermediary between the at least one organization computing system data file profile and the first client computing device data file profile; and
establish a connection with at least one client computing device and, while the connection is established, transmit a notification which, when processed by the at least one client computing device, causes the notification to be displayed on the at least one client computing device.

2. The system of claim 1, wherein the memory stores additional computer-readable instructions that, when executed by the at least one processor, further cause the computing platform to:
establish a connection with at least one organization computing device and, while the connection is established, transmit a notification which, when processed by the one or more organization computing devices, causes the notification to be displayed on the at least one organization computing device.

3. The system of claim 1, wherein the memory stores additional computer-readable instructions that, when executed by the at least one processor, further cause the computing platform to process, by the machine learning engine, the at least one organization computing system data file profile, the plurality of client computing device data file profiles, the machine learning dataset, and information with respect to historical activities, business rules, and values or rankings assigned to the plurality of data sources.

4. The system of claim 1, wherein the memory stores additional computer-readable instructions that, when executed by the at least one processor, further cause the computing platform to:
receive, by the at least one processor, via the communication interface, and from a dynamic data management gateway, at least one organization computing system private profile;
receive, by the at least one processor, via the communication interface, and from a dynamic data management gateway, authorization from the at least one organization computing system to transmit the at least one organization computing system private profile to a first client computing device; and
establish a connection with the first client computing device and, while the connection is established, transmit a data file which, when processed by the first client computing device, causes the at least one organization computing system private profile to be displayed on the first client computing device.

5. The system of claim 4, wherein the memory stores additional computer-readable instructions that, when executed by the at least one processor, further cause the computing platform to:
generate the at least one organization computing system private profile after receiving a request from the first client computing device.

6. The system of claim 1, wherein the memory stores additional computer-readable instructions that, when executed by the at least one processor, further cause the computing platform to:
receive, by the at least one processor, via the communication interface, and from the dynamic data management gateway, a first client computing system private profile;
receive, by the at least one processor, via the communication interface, and from a dynamic data management gateway, authorization from the first client computing system to transmit the first client computing system private profile to at least one organization computing device; and
establish a connection with at the least one organization computing device and, while the connection is established, transmit a data file which, when processed by the at least one organization computing device, causes the first client computing system private profile to be displayed on the at least one organization computing device.

7. The system of claim 6, wherein the memory stores additional computer-readable instructions that, when executed by the at least one processor, further cause the computing platform to:
generate the first client computing system private profile after receiving a request from the at least one organization computing device.

8. A method, comprising:
receiving, by at least one processor via a communication interface and from a dynamic data management gateway, at least one organization computing system data file profile and a plurality of client computing device data file profiles;
identifying, by a machine learning engine and based on receiving the at least one organization computing system data file profile, the plurality of client computing device data file profiles, and a machine learning dataset, a potential match between the at least one organization computing system data file profile and a first client computing device data file profile when, and only when, a second client computing device data profile serves as an intermediary between the at least one organization computing system data file profile and the first client computing device data file profile wherein the at least two intermediary matches comprises via a first intermediary match between the at least one organization computing system data file profile and the second client computing device data profile and via a second intermediary match between the first client computing device data file profile and the second client computing device data profile; and establishing a connection with at least one client computing device; and transmitting, via the connection, a notification that causes the notification to be displayed on the at least one client computing device.

9. The method of claim 8, further comprising:
establishing, via the communication interface, a connection with at least one organization computing device; and
transmitting, via the communication interface, a notification that causes the notification to be displayed on the at least one organization computing device.

10. The method of claim 8, further comprising: processing, by the at least one processor via a machine learning engine and based on the at least one organization computing system data file profile, the plurality of client computing device data file profiles, and a machine learning dataset, information with respect to historical activities, business rules, and values or rankings assigned to a plurality of data sources, to identify a potential match between the at least one organization computing system data file profile and at least one client computing device data file profile.

11. The method of claim 8, further comprising:
receiving, by the at least one processor, via the communication interface, and from the dynamic data management gateway, at least one organization computing system private profile;
receiving, by the at least one processor, via the communication interface, and from a dynamic data management gateway, authorization from the at least one organization computing system to transmit the at least one organization computing system private profile to a first client computing device; and
establishing a connection with the first client computing device and, while the connection is established, transmitting a data file which, when processed by the first client computing device, causes the at least one organization computing system private profile to be displayed on the first client computing device.

12. The method of claim 11, further comprising:
generating, based on a received request form the first client computing device, the at least one organization computing system private.

13. The method of claim 8, further comprising:
receiving, by the at least one processor, via the communication interface, and from the dynamic data management gateway, a first client computing system private profile;
receiving, by the at least one processor, via the communication interface, and from a dynamic data management gateway, authorization from the first client computing system to transmit the first client computing system private profile to the at least one organization computing device;
establishing a connection with at least one organization computing device and, while the connection is established, transmitting a data file which, when processed by the at least one organization computing device, causes the first client computing system private profile to be displayed on the at least one organization computing device.

14. The method of claim 13, further comprising:
generating, based on a received request form the at least one organization computing device, the first client computing system private profile.

15. One or more non-transitory computer-readable media storing instructions that, when executed by a computing platform comprising at least one processor, memory, and a communication interface, cause the computing platform to:
receive, by the at least one processor, via the communication interface, and from a dynamic data management gateway, at least one of an organization computing system data file profile and an organization computing system private profile, and at least two client computing device data file profiles;
process, based on receiving the organization computing system data file profile, the at least two client computing device data file profiles, and a machine learning dataset, via a machine learning engine, from a plurality of data sources, information with respect to historical activities, business rules, and values or rankings assigned to the plurality of data sources, to identify a potential match between the organization computing system data file profile and at least one client computing device data file profile;
identify, based on receiving the organization computing system data file profile, the at least two client computing device data file profiles, and a machine learning dataset, a potential set of intermediary matches between the organization computing system data file profile and a first client computing device data file profile when, and only when, the first client computing device data file profile fails to directly match with the organization computing system data file profile and a second client computing device data profile serves as an intermediary between the organization computing system data file profile and the first client computing device data file profile and is associated with the potential set of intermediary matches; and
establish a connection with the first client computing device and, while the connection is established, transmit a notification which, when processed by the one or more client computing devices, causes the notification to be displayed on the first client computing device.

16. The non-transitory computer-readable media of claim 15 which stores additional instructions that, when executed by the computing platform, cause the computing platform to:
establish a connection with an organization computing device and, while the connection is established, transmit a notification which, when processed by the one or more organization computing devices, causes the notification to be displayed on the organization computing device.

17. The non-transitory computer-readable media of claim 15 which stores additional instructions that, when executed by the computing platform, cause the computing platform to:

receive, by the at least one processor, via the communication interface, and from the dynamic data management gateway, authorization from the at least one organization computing system to transmit the at least one organization computing system private profile to the first client computing device; and establish a connection with the first client computing device and, while the connection is established, transmit a data file which, when processed by the first client computing device, causes the at least one organization computing system private profile to be displayed on the first client computing device.

18. The non-transitory computer-readable media of claim 15 which stores additional instructions that, when executed by the computing platform, cause the computing platform to:

receive, via the communication interface, and from the dynamic data management gateway, a first client computing system private profile;

receive, via the communication interface, and from the dynamic data management gateway, authorization from the first client computing system to transmit the first client computing system private profile to at least one organization computing device;

establish a connection with the organization computing device; and transmit a data file which, when processed by the at least one organization computing device, causes the first client computing system private profile to be displayed on the organization computing device.

* * * * *

UNITED STATES PATENT AND TRADEMARK OFFICE
CERTIFICATE OF CORRECTION

| | |
|---|---|
| PATENT NO. | : 11,171,839 B2 |
| APPLICATION NO. | : 17/201991 |
| DATED | : November 9, 2021 |
| INVENTOR(S) | : Dhawan et al. |

It is certified that error appears in the above-identified patent and that said Letters Patent is hereby corrected as shown below:

In the Claims

Column 13, Line 28:
Claim 10, after "comprising:", insert --¶--

Column 13, Line 35:
Claim 10, delete "identity" and insert --identify--

Signed and Sealed this
First Day of March, 2022

Drew Hirshfeld
*Performing the Functions and Duties of the
Under Secretary of Commerce for Intellectual Property and
Director of the United States Patent and Trademark Office*